United States Patent [19]

van der Lely

[11] Patent Number: 4,775,013

[45] Date of Patent: Oct. 4, 1988

[54] SOIL TILLING MACHINE

[76] Inventor: Cornelis van der Lely, 7 Brüschenrain, Zug, Switzerland

[21] Appl. No.: 113,392

[22] Filed: Oct. 27, 1987

Related U.S. Application Data

[63] Continuation of Ser. No. 801,820, Nov. 26, 1985, abandoned.

[30] Foreign Application Priority Data

Nov. 26, 1984 [NL] Netherlands .......................... 8403583
Jul. 10, 1985 [NL] Netherlands .......................... 8501973

[51] Int. Cl.⁴ ........................ A01B 45/02; A01B 33/06
[52] U.S. Cl. ........................................ 172/57; 172/68; 172/117; 172/610; 172/713
[58] Field of Search .................... 172/57, 58, 59, 49.5, 172/117, 522, 526, 49, 52, 57, 63, 68

[56] References Cited

U.S. PATENT DOCUMENTS

| | | | |
|---|---|---|---|
| 455,170 | 6/1891 | Cleveland | 172/57 |
| 673,304 | 4/1901 | Tharp | 172/522 |
| 1,184,276 | 5/1916 | Townsend | 172/57 |
| 1,360,868 | 11/1920 | Beise | 172/49.5 |
| 1,419,953 | 6/1922 | Binmore | 172/57 |
| 1,561,987 | 11/1925 | Garcia . | |
| 1,773,672 | 8/1930 | Grim . | |
| 2,560,352 | 7/1951 | Kelsey | 172/59 |
| 3,970,012 | 7/1976 | Jones | 172/484 |
| 4,124,078 | 11/1978 | van der Lely | 172/117 |
| 4,148,364 | 4/1979 | Gross-Scharmann | 172/58 |
| 4,224,997 | 9/1980 | van der Lely | 172/52 |
| 4,270,615 | 6/1981 | van der Lely | 172/49 |

FOREIGN PATENT DOCUMENTS

| | | |
|---|---|---|
| 37076 | 4/1886 | Fed. Rep. of Germany . |
| 103567 | 4/1898 | Fed. Rep. of Germany . |
| 114617 | 10/1900 | Fed. Rep. of Germany . |
| 297437 | 4/1917 | Fed. Rep. of Germany . |
| 320700 | 8/1902 | France . |
| 13757 | of 1851 | United Kingdom .................. 172/57 |

Primary Examiner—Richard J. Johnson
Attorney, Agent, or Firm—Penrose Lucas Albright; Robert A. Miller

[57] ABSTRACT

A soil tilling machine comprising subsoil tilling members, known as subsoilers, which are drivable via a tractor's PTO around inclined upwardly directed axes. The subsoilers are each primarily constituted by a fowardly and downwardly inclined extending shaft. In front of the tilling members, coulter discs are arranged which cut trenches through which the subsoilers' shafts can move so that the subsoil is intensively worked and broken up while the surface of the soil is hardly disturbed. A roller wheel which controls the depth of the subsoilers is disposed to their rear. The subsoilers are supported by a frame which is hingedly attached to a frame portion having a rectangular trestle for coupling to a tractor's three-point hitch via a spring-loaded parallelogram arrangement which assists in permitting the subsoilers to lift automatically if they encounter obstructions. The subsoilers comprise two part connected shafts with the lower part of each shaft having propeller-like projections and being readily removable from the upper shaft part. The projections work the soil under their respective coulter discs.

14 Claims, 6 Drawing Sheets

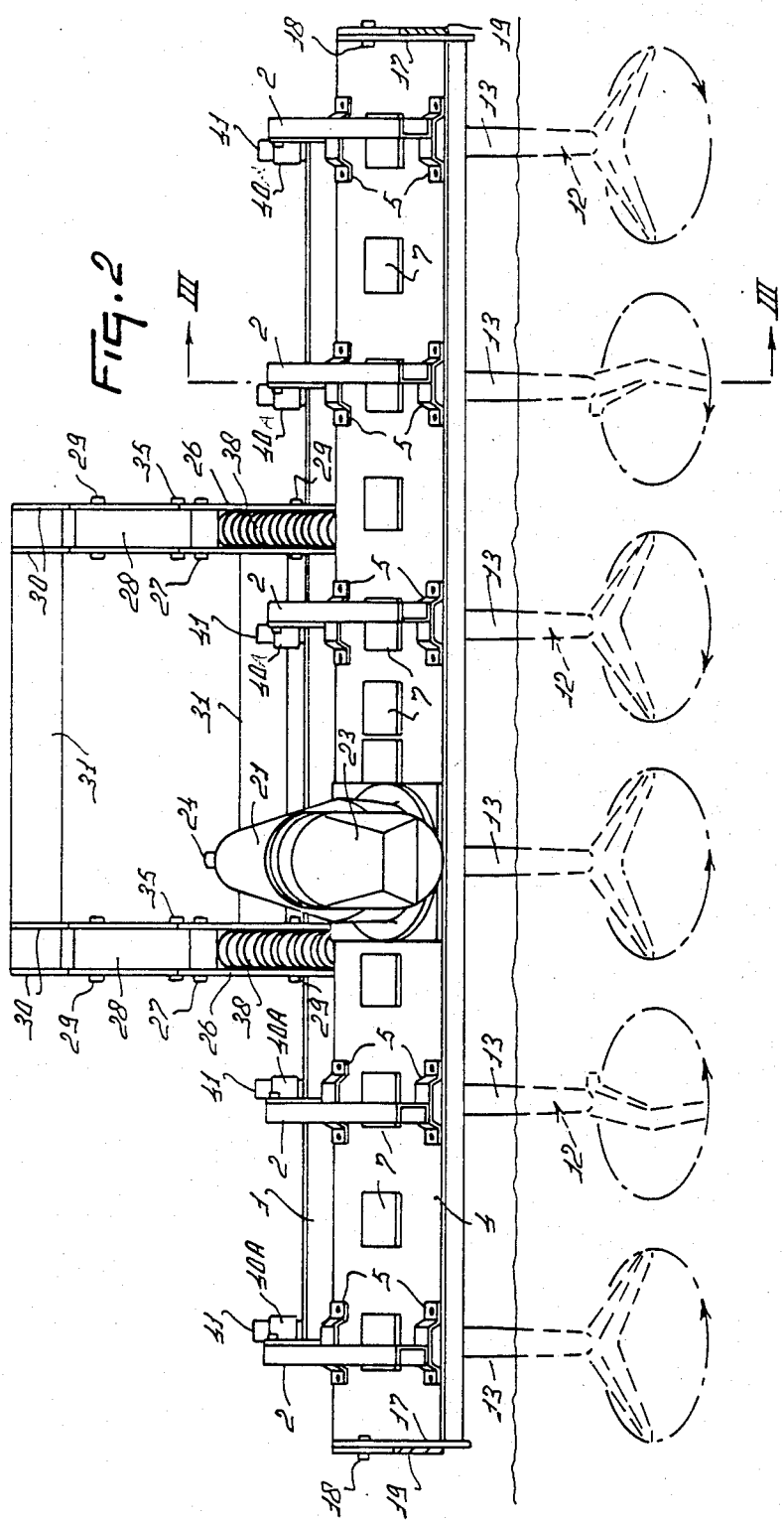

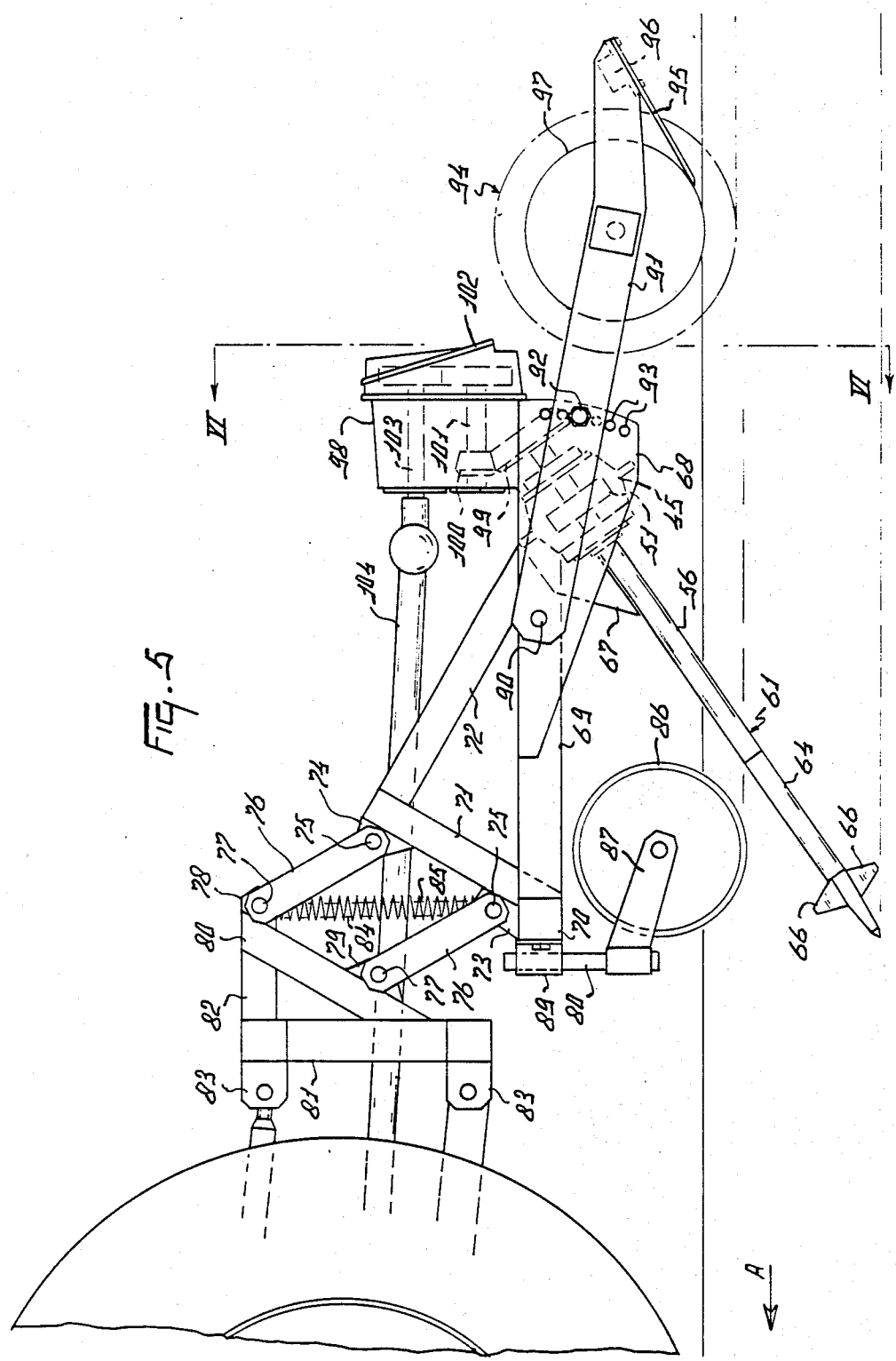

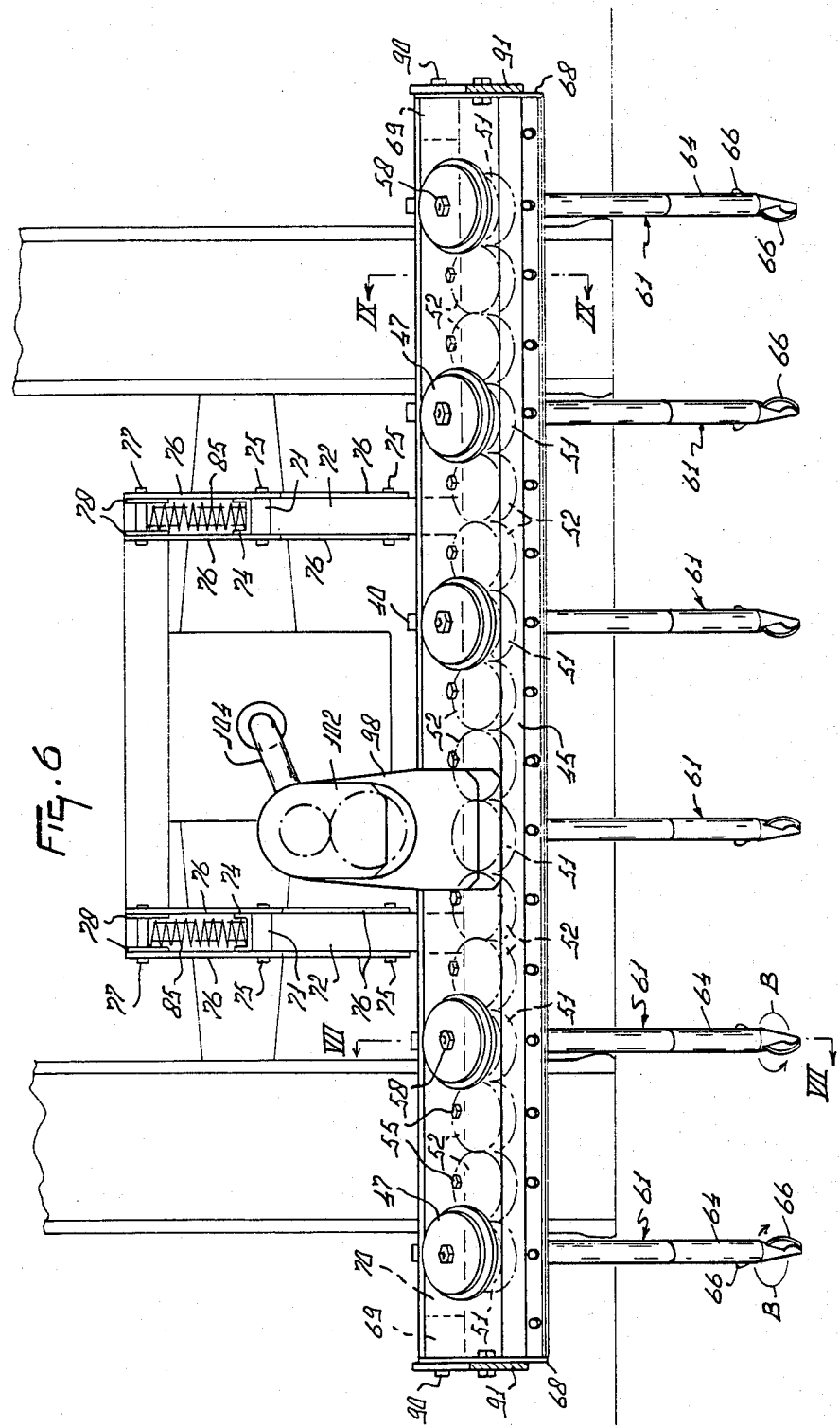

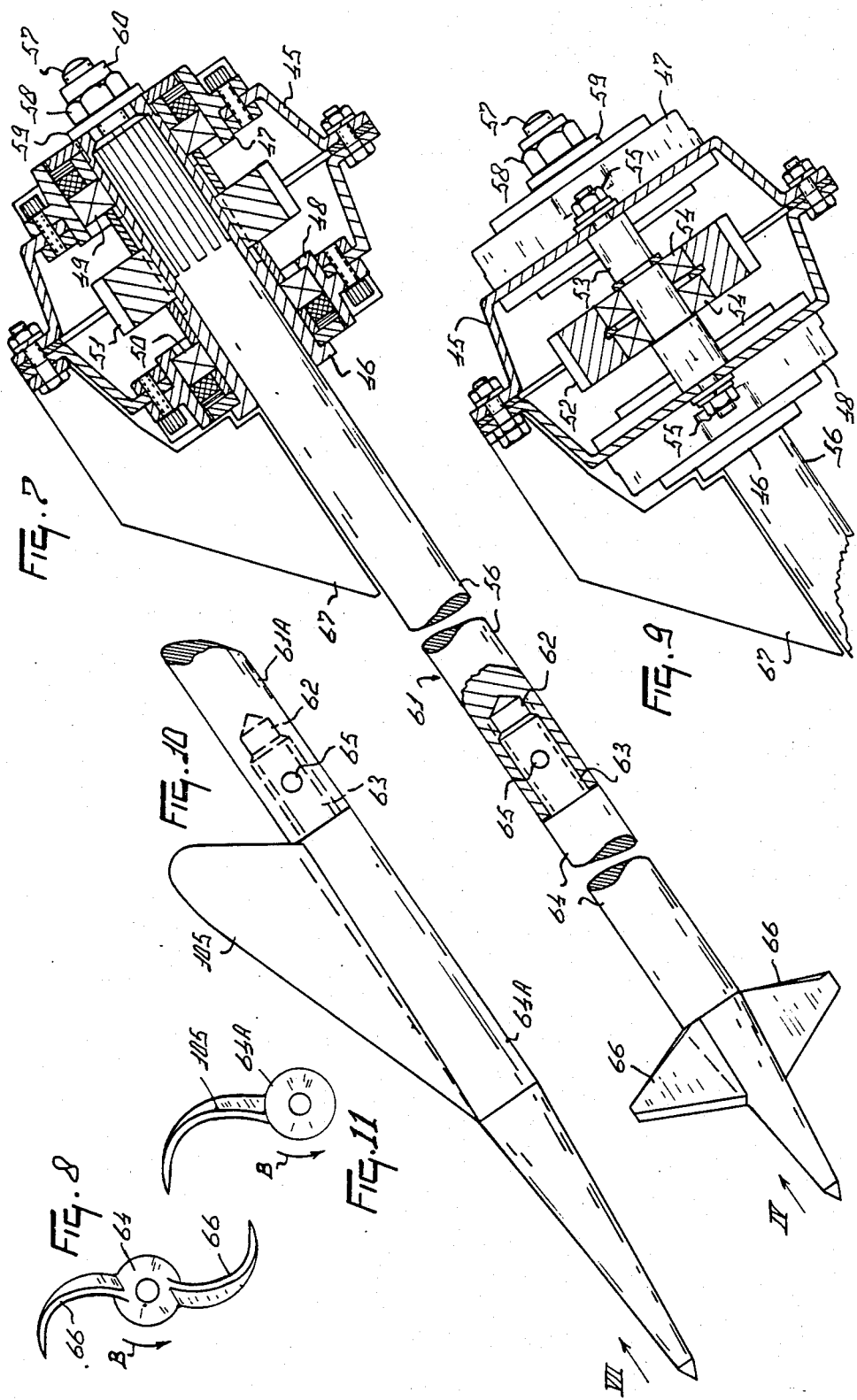

SOIL TILLING MACHINE

This is a continuation of application Ser. No. 801,820, filed Nov. 26, 1985, now abandoned.

SUMMARY OF THE INVENTION

The invention relates to a soil tilling machine, comprising a plurality of tilling members which are drivable around upwardly directed axes.

Soil tilling machines of such a type are usually not suitable for working hard layers embedded in the subsoil.

Using the construction according to the invention, a machine is obtained with which hard layers in the subsoil are efficiently be broken by means of a tilling member in the form of a subsoiler which is predominantly constituted by a forwardly and downwardly extending shaft.

This proposed construction provides a device with which, using the subsoiler, a water-impermeable layer in the subsoil is efficiently broken without the upper soil being cultivated.

A further aspect of the invention relates to a soil tilling machine in which one or more tilling members are in the form of a subsoiler the, lower end of which is provided with at least two projections arranged at an angle relative to each other. With the aid of this structure the working range of a tilling member is effectively be increased. In this situation at least one projection may extend over an angle of 90° or more relative to the center line of the tine.

Another aspect of the invention relates to a disc coulter arranged in front of a tilling member in the form of a subsoiler. By means of this feature, a trench is formed in the field allowing the upper side of the tilling member to move. This prevents, during use of the machine, the top layer from being broken in an unwanted manner, so that it is possible efficiently to cultivate grassland or fields on which there is already a crop, with this machine.

A still further aspect of the invention relates to a tilling member in the form of a subsoiler, a scraper cooperating with the subsoiler being provided. In this manner an efficient operation of the soil tilling member is not adversely affected by residues sticking to it.

Still another aspect of the invention relates to a soil tilling machine of the above-defined type, in which a shaft portion of a tilling member in the form of a subsoiler, is divided and has an exchangeable portion, so that a tilling member can be provided with different subsoiling parts and a damaged subsoiler can easily be replaced.

Finally, the invention relates to a soil tilling machine having a three-point lifting device for being coupled to the lifting device of a tractor, that portion of the machine supporting the tilling member being fastened so it is capable of up and down movement to the rear. When an obstacle is met, that portion of the machine which supports the tilling member deflects so, that the obstacles are rapidly surmounted and damage is prevented.

The invention will now be described in greater detail by way of example with reference to the embodiments shown in the accompanying drawings, wherein:

DESCRIPTION OF THE DRAWINGS

FIG. 2 is a view along the line II—II in FIG. 1;

FIG. 5 is a side elevational view of a second embodiment of a soil tilling machine according to the invention;

FIG. 6 is a view along the line VI—VI in FIG. 5;

FIG. 7 shows, on a larger scale, a broken partly sectional view along the line VII—VII in FIG. 6;

FIG. 8 is an end view in the direction of arrow II in FIG. 7;

FIG. 9 shows, on an enlarged scale, a view along the line IX—IX in FIG. 6;

FIG. 10 shows, on the same scale as in FIG. 7, a third embodiment of a subsoiler of a machine according to the invention; and FIG. 11 is an end view in the direction of arrow VII in FIG. 10.

DESCRIPTION OF THE PERFERRED EMBODIMENTS

The arrangement shown in the FIGS. 1–4 is a soil tilling machine which is more specifically suitable for use as a subsoiler.

The machine comprises a frame beam 1 which extends transversely of the intended direction of travel A and is in an at least substantially horizontal position.

Figure 1:
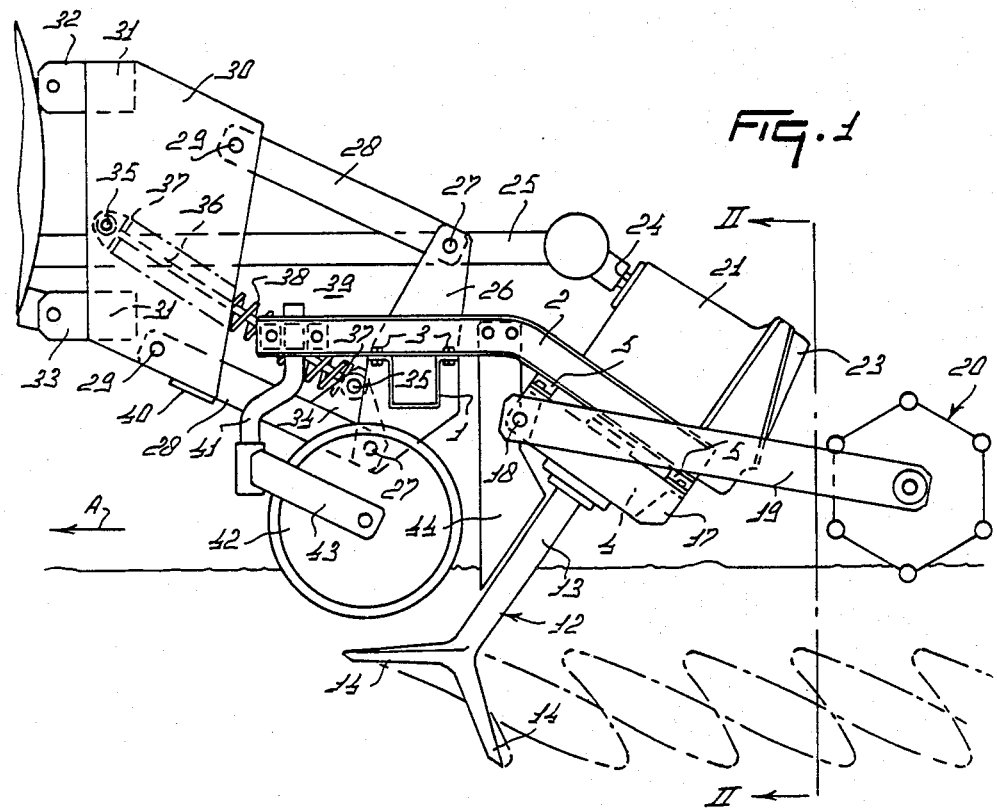
FIG. 1 is a side elevational view of a soil tilling machine according to the invention.
Figure 4:
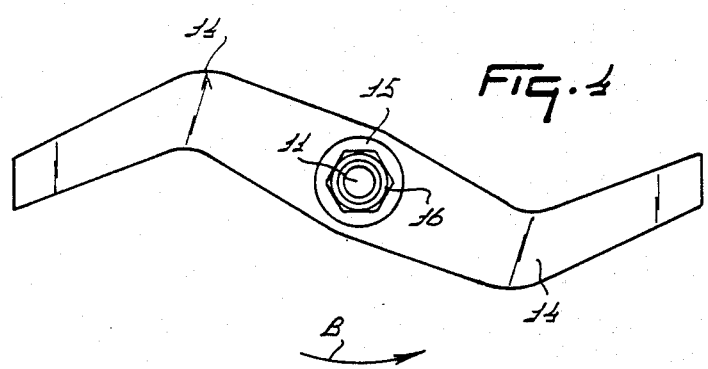
FIG. 4 shows a view in the direction of arrow IV in FIG. 3.

The frame beam has a U-shaped profile arranged such that the legs extend at least substantially vertically. A total of six supports 2 are disposed near the ends of the frame beam 1 and are equispaced between these ends, one of the supports being shorter than the others. The supports extend at least substantially in parallel with a vertical plane in the direction of travel A of the machine. Each support 2 has an at least substantially horizontally extending portion which, just behind the center, passes via a bend having an angle of approximately 145° into a portion which extends at a downward angle and to the rear (FIG. 1). The supports 2 are fastened near the centers of their front portions by means of bolts 3 to right-angled, folded-over ends of the upward legs of the U-shaped profile which constitutes the frame beam 1. Each support 2 is also constituted by a U-shaped profile. They are arranged such that the legs of the front portion extend substantially in the horizontal direction. The supports 2 are so arranged on both sides of the frame beam 1 that the legs always point outwardly.

Figure 3:
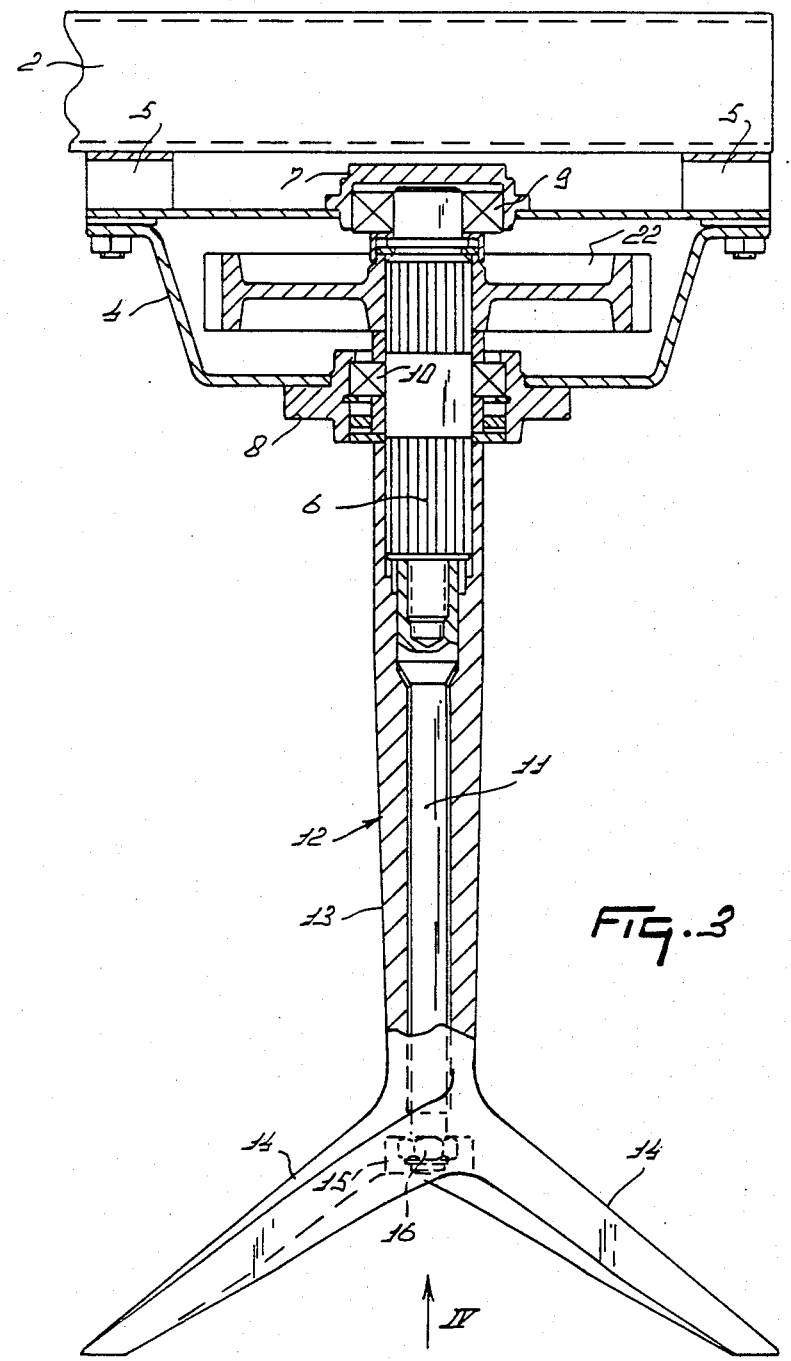
FIG. 3 is a view along the line III—III in FIG. 2.

A frame portion 4 is fastened to the bottom of the downwardly and rearwardly extending portions of the respective supports 2 by means of brackets 5 which are fastened near the front and rear sides of the frame portion. In this situation the supports 2 are fitted on both sides of the symmetry plane of the arrangement to oppositely facing sides of the brackets 5 (FIG. 2). Equidistant shafts 6 are bearing-supported in the frame portion 4 by means of respective bearings 9 and 10 contained in bearing housings 7 and 8, respectively, which are accommodated in the top and bottom sides of the frame portion 4. At their bottom sides the shafts 6 are provided with a screw thread on which a rod 11 is screwed, whose bottom end is also provided with a screw thread. Provided on the rod is a tilling member 12 which is predominantly in the form of a subsoiler and includes a hollow shaft-like portion 13 which at its inner side has three parts of decreasing diameters. The part having the largest diameter is provided by means of splines on the bottom end of the shaft 6. The bottom side of the tilling member 12 has two oppositely-extending projections 14 which, viewed transversely of the direction of the common longitudinal axis of the shaft 6 and the shaft portion 13 are rectilinear and enclose between them an angle of approximately 110° (FIG. 3). Together with the longitudinal center line of the shaft portion 13 a projection 14 encloses an angle greater than 90°. From the shaft 13 of the tilling member 12 the respective projections 14 taper and are of an angular construction. The cross-section of a projection 14 is here somewhat in the shape of a trapezium, the surface decreasing towards the free end. At their bottoms the projections 14 which are formed integrally with the shaft portion 13, have a recessed portion 15 in which a nut 16 is located which cooperates with a screw-thread on the rod 11 to secure the tilling member 12, which is in the form of a subsoiler, to the rod. Halfway its length each projection 14 has a bend which, via an angle of approximately 130°, interconnects substantially straight portions, the straight portion extending to the end being folded forwards relative to the direction of rotation B imparted to a projection during operation.

Studs 18 which extend transversely of the intended direction of travel A and around which arms 19 which extend to the rear along the plates 17 are provided so as to be freely rotatable, are arranged near the ends at the front side of the plates 17 attached to frame portion 4. A roller 20 is arranged freely rotatably between the free ends of the arms 19. In this embodiment the roller 20 has longitudinal rod-shaped elements; this roller may however be of any structure.

An adjusting device, not further shown, for adjusting and locking the arms 19 in a plurality of positions, to permit setting of the desired working depth of the subsoilers 12 formed by the shaft portions 13 and the projections 14 is arranged near the rear side of frame portion 4.

Within frame portion 4 each shaft 6 is provided with a straight-toothed gear wheel 22. With the exception of the two subsoilers 12 arranged near the center of the frame portion 4 identical gear wheels are supported freely rotatable by means of shorter shafts in the frame portion, between the remaining subsoilers 12. Two smaller gear wheels are arranged between the subsoilers 12 located near the center, the arrangement is such that the subsoilers 12 at both sides of the symmetry plane of the machine rotate in opposite directions (see FIG. 2), the subsoilers located at the same side rotating in the same direction. Thus, a quiet running of the machine during operation is obtained.

Near its center, a shaft 6 of a subsoiler 12 is extended in the upward direction and reaches to a gear box 21, within which the shaft is in connection via a bevel gear transmission and a speed variator 23 at the rear of the gear box to a shaft 24 which projects from the gear box and extends in a direction parallel with a vertical plane extending in direction A. The relevant shaft 24 is adopted to be coupled to the power take-off shaft of a tractor by means of an intermediate shaft 25. As is obvious from FIGS. 2 and 3, the shafts 6 of the respective subsoiler 12 are disposed by means of the gear wheels 22 and the gear wheels therebetween, that the pairs of projections 14 are arranged relative to each other to trace the patterns shown in FIGS. 1 and 2. This arrangement has a very advantageous effect in providing the machine runs as quiet as possible.

Pairs of plates 26, which extend substantially in parallel with the aforesaid vertical plane and project to above and below the frame beam 1, are arranged equidistantly from the center. Arms 28, which are capable of swiveling around hinge pins 27 extending substantially transversely of the direction of travel A, are provided between the pairs of plates 26 near the upper and lower sides. At their forward aspects arms 28 are swivable around hinge pins 29 which are in parallel with the hinge pins 27 and are arranged between pairs of plates 30 which are interconnected near the front by means of their top and bottom sides by means of two cross-beams 31. Forwardly extending lugs 32, which form an upper coupling point for a three-point lifting hitch of a tractor, are provided near the center of the upper cross-beam 31. The lower cross-beam 31 is provided near its end with pairs of forwardly extending lugs 33, which constitute the lower coupling point for the three-point lifting hitch of the tractor. At the rear, the lower arms 28 are provided at their upper sides with an upwardly directed support 34 to which a rod 36 is fastened by means of a rear pin 35. At the top, the rod 36 is shiftable relative to a forward stop 37 which is fastened so as to be capable of relative to forward pin 35, near the center at the front side between the plates 30. A respective pretensioned pressure spring 38 is arranged around each rod 36 between the forward stop 37 at the top and a fixed rear stop 37 at the bottom, all this such that the pressure spring 38 tries to keep the parallelogram 39 formed by the hinge pins 27 and 29 and the arms 28 in a predetermined position during operation of the machine, the lower arms 28 bearing on a stop 40 fastened between the plates 30. An upwardly directed arm 41, in the form of a crank and having at its bottom end a disc coulter 42, is provided at the front of each support 2 by means of a bushing 40A. The circumference of the disc coulter 42 is provided with a cutting edge and is provided freely rotatable between support 43 extending to the rear from the arm, all this such that, viewed in the intended direction of travel A, the coulter is directly in front of a subsoiler 12. This arrangement is possible by the supports 2 being arranged eccentrically relative to the brackets 5. In addition, each support has a downwardly-directed plate-shaped scraper 44 which flares towards its end to near the shaft-shaped portion 13 of a subsoiler 12. In this situation, the scraper 44 extends from at least the upper side to beyond the center of the shaft-shaped portion 13 of the subsoiler.

The machine described in the foregoing operates as follows:

During operation, the machine is coupled to the three-point lifting hitch of a tractor by means of coupling points constituted by the lugs 32 and 33 and from the power take-off shaft of the tractor. Subsoilers 12 located on both sides of the symmetry plane of the machine can be driven by means of the intermediate shaft 25 and the above-described transmission such that the subsoilers 12 located at the same side of the symmetry plane rotate in the same direction as illustrated by means of arrows in FIG. 12.

As previously described, the working depth of the subsoilers 12, which during operation are directed forwardly at an angle of at least 50° and preferably 55° with respect to the horizontal, can be set with the aid of the roller 20 located at the rear of the cylindrical frame portion 4.

During operation, when the machine travels in the direction indicated by arrow A, the respective discs are loaded such by means of the pressure spring 38 provided around the rods 36, that they cut a trench in the field to which the shaft-shaped portion 13 of a subsoiler 12 can move. During this machine travel the projections 14 located at the bottom end of a portion 13 and extending in opposite direction are moved through the ground in such a manner that hardened layers in the subsoil can be loosened efficiently. In this situation, the projections 14 assume a position as shown in FIG. 1, one projection extending at least substantially in the horizontal direction and the other projection being arranged in this position in a somewhat dragging manner.

During operation, the scraper plates 44 ensures that no unwanted material sticks to the shaft-shaped portion 13 of the subsoilers 12. Since the subsoilers on both sides of the symmetry plane rotate in opposite senses, any occurring reaction forces are effectively compensated for.

As will be obvious from FIG. 1, the projection 14 which extends in an at least substantially horizontal direction is located almost entirely below the disc 42, the shaft-shaped portion 13 of the subsoiler 12 moving almost directly after passing of the disc through the newly cut trench, so that this requires little power as the trench contains few, if any, obstacles.

By means of the parallelogram 39, whose lower hinge points are located before the upper hinge points, the whole assembly of the discs 42, subsoilers 12 and rollers 20 can move against the action of the springs 38 at an angle to the rear and upwards when obstacles are met. With the aid of the above-described machine it is easy to cultivate fields carrying a crop and/or grasslands to break impermeable layers, the upper soil substantially not being disturbed. Because—as will be evident from FIG. 2—the tracks described by the projections 14 are spaced apart by a distance which amounts to half the diameter of the track of the projections, the machine is highly suitable for use in row cultures.

The arrangement shown in FIGS. 5-11 comprises a substantially horizontally directed hollow beam 45, which extends transversely of the intended direction of travel A and is formed by two identical parts, which are predominantly U-shaped and clamped together by means of folded-over edges and bolts. In beam 45 bushings 46 are bearing-supported equidistantly from each other (FIG. 7). The bushings 46 are supported in the upper and lower walls of the cylindrical beam 45 by means of bearings 49 and 50 accommodated in bearing houses 47 and 48, respectively. Each bushing 46 is provided at its outer circumference with splines for a gear wheel 51, located near the center of beam 45. The splines extend from the upper side to beyond the center of each bushing 46.

Two freely rotatable gear wheels 52 are provided between two gear wheels 51 on adjacent bushes 46. The gear wheels 52, which have a diameter equal to the diameter of the gear wheels 51, are supported by means of fixed shafts 53 and fitted on these shafts by means of superjacent bearings 54. Each shaft 53 is secured in the upper and lower wall, respectively, of beam 45 by means of a nut 55 which is screwed on the threaded shaft ends.

Beam 45 is arranged such that a plane perpendicular to the longitudinal center line of a bushing 46 encloses an angle of approximately 45° to the horizontal plane. The longitudinal center line of the bushing is in this situation directed at a forward angle and downwardly at an angle of 35° in the intended direction of travel of the machine. At its interior, each bushing 46 is provided from its center to the top with splines with which splines at the top of a shaft portion 56 can cooperate. The shaft portion 56 is secured to the upper end of the bushing 46 by means of a threaded stud 57 fitted to the top end, a nut 58, a retaining plate 59 and a locking ring 60. The shaft portion 56 forms part of a tilling member 61 in the form of a subsoiler, which—as will be clear from inter alia FIG. 5—is predominantly shaft-shaped.

The bottom end of shaft portion 56 is provided with a cylindrical recess portion 62, which is located concentrically relative to the longitudinal center line which coincides with the longitudinal center line of the bushing 46. At its inside, the cylindrical recessed portion 62 is provided with splines with which splines on a stud 63, which form the upper end of a shaft portion 64, this stud being locked in the recess by means of a pin 65, cooperate. The bottom end of the shaft portion 64 tapers to the free end over a distance equal to approximately one-third of the overall length of the shaft portion (FIG. 5). The tapering portion has a sharp point and diametrically opposite projections in the form of blades 66, which extend to at least substantially halfway of the tapering portion (FIGS. 5 and 7).

The blades 66 are of a triangular shape, the triangle being an isosceles triangle, its base being fastened to the tapering portion. The diametrically opposite blades 66 of plate material are folded such that the whole assembly assumes the shape of a propeller (FIG. 7) and the free ends of the blades extend forwards in the direction of rotation B of the tilling member 61 (FIG. 8).

The front side of hollow beam 45 is provided in the region of each tilling member 61 with plate members 67 which extend by means of their bottom sides along a predetermined distance along the shaft portion 56 of the subsoiler 61. The plate members 67 constitute scrapers with the aid of which the shaft portions 56 can be kept free from adhering soil. The ends of beam 45 are provided with plates 68 which, in side view, are sector-shaped, the largest width being at the rear side.

At the front side of beam 45 forwardly-extending beams 69 are arranged near the ends of beam 45, the plates 68 acting as supports. The beams 69 are interconnected at their front ends with the aid of a beam 70, which extends transversely of the intended direction of travel A and is arranged substantially horizontally.

The frame beam 70 is provided on both sides of the center, and equidistantly from the center, with a support 71 which extends at an upward angle and to the rear. The support 71 is connected to the front side of beam 45 by means of a support 72 which extends at a downward angle and to the rear. The supports 71 and 72 are arranged such that together they define a rectangle (FIG. 5).

Near its bottom and top sides, the front side of the support 71 is provided with lugs 73 and 74, respectively. Freely swivable arms 76 are arranged on both sides of the lugs 73 and 74 by means of shafts 75 which extends transversely of the direction of travel A and at least substantially horizontally. The arms 76 are pivotably connected, to lugs 78 and 79 at the rear of a support 80, by means of shafts 77 which extend in parallel with the shafts 75. At its bottom side, the support 80 is connected to the rear side of a rectangular coupling member 81, while the top side of the support 80 is connected to the upper side of the rectangular member 81 by means of a connecting member 82. The rectangular member 81 is provided at its front side with coupling points 83 constituting a three-point arrangement for coupling the device to the three-point hitch of a tractor.

Between the upper shafts 77 and the lower shafts 75 of each hinging rectangle formed by the arms 76 and being in the shape of a parallelogram, a pressure spring 85 is present which counteracts deformation of the hinging rectangle and is provided around a rod 84 which is disposed such that one end of it is capable of shifting.

In the region of the subsoilers 61 the beam 70 is provided with disc-coulters 86. The disc-coulters 86 are arranged freely rotatably between the legs of a U-shaped support 87, which, by means of an upwardly directed shaft 88, is capable of free rotation in a bushing 89 fastened to the front of the frame beam 70.

Near the front side, each of the sector-shaped plates 68 has a shaft 90, which extends transversely of the intended direction of travel A and around which a rearwardly extending arm 91 is arranged capable of free rotation. By means of a pin 92 passed through a hole in the arm and one of a plurality of holes 93 at the rear of each plate 68 each of the arms 91 is adjustable to a plurality of positions and is lockable.

A roller 94 which in this embodiment is constituted by a packer roller is arranged between the arms 91 by means of bearings and shafts and is capable of free rotation. Scrapers 95 fastened to a cross-beam 96 arranged between the ends of the arms 91 and extending at least substantially transversely of the intended direction of travel A extend between the rows of packer roller projections. The ends of the scrapers 95, which extend at a downward angle and to the front, bear against a cylindrical portion 97 of the packer roller 94 located at a circumferential angle of at least 45° to the horizontal plane through the rotary axis of the roller. The shaft portion 56 of one of the shaft-shaped subsoilers 61 located near the center, extends to over beam 45 and into a gear 98, accommodated on this beam.

Inside the gear box 98, on the extension, a bevel gear wheel 99 is provided which can cooperate with a bevel gear wheel 100 on a shaft 101 which extends in the intended direction of travel A and is in drivable connection via a speed variator 102 at the rear of the gear wheel box with a shaft 103, the front end of which projects from the gear wheel box and is couplable to the power take-off shaft of a tractor by means of intermediate shaft 104.

The machine shown in the FIGS. 5–11 operates as follows:

During operation, the rectangular coupling member 81 is coupled by means of the coupling points 83 to the three-point hitch of a tractor and the whole assembly can be moved by means of the tractor in a direction as indicated by arrow A. Thus the predominantly shaft-shaped subsoilers 61 which extend at a downward angle of approximately 35° and forwardly, can be caused to rotate, all this such that the subsoilers rotate in opposite senses (B) during operation. The spacing between the rotary axes of two adjacent subsoilers 61 is approximately forty-five centimeters. During movement through the soil, subsoilers break the subsoil with the aid of the propeller-shaped blade 66, whose pointed ends face forward, while the layer on top thereof is substantially not disturbed by the preferably round shaft portions 56 and 64, which preferably have a diameter of approximately fifty millimeters.

Trenches are made in the soil by means of the disc coulters 86 which precede each shaft-shaped subsoiler 61, as a result of which the subsoil is disturbed to a still lower extent by the shaft portions 56.

As is illustrated in FIG. 1, the front side of a disc coulter is located substantially over the point of the shaft portion 64. Thus an appropriate cooperation between a disc coulter and the subsoilers 61 is created.

The working depth is determined by the packer roller 94, which is adjustable to a plurality of positions relative to the subsoilers 61 by means of the arms 91. During operation the packer roller 94 is kept free from adhering soil by means of the scrapers 95. The frame formed by hollow beam 45 and the beams 69 and 70, which supports the shaft-shaped subsoilers 61 and the disc coulter 86, can adapt itself efficiently to any surface undulation by means of the hinging quadrangle formed by the arms 76, movement then taking place against the action of the springs provided between the upper and lower hinge pins 77 and 75, respectively.

Instead of the above-described exchangeable shaft portions 64, carrying the blades 66, of the subsoilers, it is alternatively possible to use an exchangeable shaft portion 64A of a construction as shown in FIGS. 10 and 11. Then a single blade 105 is provided on a cylindrical portion of the exchangeable shaft portion 64A, which portion extends along approximately one half of this shaft portion.

In this embodiment the blades 105 are predominantly in the form of a right-angled triangle, the largest leg being fastened to the shaft portion 64A and the smallest leg passing from the connecting point via a flowing curve into the hypothenuse, all this such that the upper part of the blade is located above the connection point of the shaft portion 64A to the shaft portion 56. Also in this embodiment, the blades are in the shape of a propeller and folded over in the direction of rotation B.

When a subsoiler of a construction as shown in FIGS. 10 and 11 is used, it is possible to accomplish breaking of the soil with a tapering portion such that the soil comes within the reach of the blades 105 located thereabove, which exerts a greater pressure causing the overall cohesion of this layer to be broken.

Having disclosed my invention, what I claim as new and to be secured by Letters Patent of the United States is:

1. A soil tilling machine comprising an even number of soil tilling members, an equal number disposed to each side of a plane of symmetry parallel to the direction of travel; means for driving said soil tilling members to rotate about upwardly and rearwardly inclined axes of rotation, said tilling members on opposite sides of the plane of symmetry rotating in counter directions, each said tilling member being in the form of a subsoiler primarily constituted by a forwardly and downwardly extending shaft rotating about a respective said inclined axis of rotation and means for tilling disposed on the forward aspect of said shaft, each said tilling means constructed and arranged for operating entirely under the top layer of soil through which said shaft extends during operation, and a disc coulter for each said shaft which is accurately aligned relative to the machine's operative direction of travel and which is disposed in such a way that its front side, when viewed from above, is located substantially over the point of the shaft of said tilling means.

2. A soil tilling machine as claimed in claim 1 wherein said means for tilling comprises at least two projections arranged at an angle relative to each other.

3. A soil tilling machine as claimed in claim 1 comprising a scraper which cooperates with said subsoiler.

4. A soil tilling machine as claimed in claim 1 wherein each said tilling member has a lower removable shaft portion, which tapers over its bottom one third to a sharp point, said tapering bottom one third being provided with oppositely directed projections at about the midpoint of the taper.

5. A soil tilling machine as claimed in claim 4, wherein each said projection narrows towards its outer end and has an isosceles triangular cross-section, the base of the triangle being at said tapering shaft portion.

6. A soil tilling machine as claimed in claim 5 wherein, seen in parallel with the direction of the rotary axis, each said projection curves outwardly in the direction of rotation.

7. A soil tilling machine as claimed in claim 4 comprising a frame wherein each said tilling member has an upper shaft rotatably supported in said frame which is hollow at least in part and a rod connected to the lower end of said upper shaft.

8. A soil tilling machine as claimed in claim 1 wherein said shaft comprises at least two parts, one of which is adapted to be exchanged with other parts.

9. A soil tilling machine as claimed in claim 1 wherein said tilling members have a lower removable shaft shaped portion which tapers to a sharp point, said removable shaft portion having an essentially right angle triangular shaped projection that is curved in the direction of rotation having one side lying along the shaft and one end of the hypoteneuse tapering toward the pointed end.

10. A soil tilling machine comprising an even number of soil tilling members, an equal number disposed to each side of a plane of symmetry parallel to the direction of travel; means for driving said tilling members to rotate about upwardly and rearwardly inclined axes of rotation, said tilling members on opposite sides of the plane of symmetry counter rotating, each said tilling member being in the form of a subsoiler primarily constitutted by a forwardly and downwardly extending shaft rotating about a respective said inclined axis of rotation and means for tilling disposed on the forward aspect of said shaft, said tilling means constructed and arranged for operating entirely under the top layer of soil through which said shaft extends during operation, a disc coulter for each said shaft which is accurately aligned relative to the machine's operative direction of travel and which is disposed in such a way that its front side, when viewed from above, is located substantially over the point of the shaft of said tilling means and scraper means disposed over the rearward aspect of each said shaft for operatively cooperating with said rearward aspect while it is operating above the soil to displace material from adhering thereto.

11. A soil tilling machine as claimed in claim 10, further comprising means for adjusting the depth of penetration into the ground of said soil tilling members.

12. A soil tilling member comprising an even number of soil tilling members, an equal number disposed to each side of plane of symmetry parallel to the direction of travel; means for driving said soil tilling members to rotate about upwardly and rearwardly inclined axes of rotation, said tilling members on opposite sides of the plane of symmetry counter rotating, each said tilling member being in the form of a subsoiler essentially constituted by a forwardly and downwardly extending shaft rotating about a respective said axis of rotation and means for tilling disposed on the forward aspect of said shaft, said tilling means constructed and arranged for operating entirely under the top layer of soil through which said shaft extends during operation, a disc coulter for each said tilling member which is aligned in the machine's operative direction of travel and, as viewed from above, with its front side located substantially over the point of the shaft of said tilling member so as to create appropriate cooperation between said disc coulter and said tilling member, and a plate shaped scraper arranged over the rearward aspect of each said shaft for freeing extraneous material from said rearward upper aspect of the corresponding said shaft.

13. A soil tilling machine comprising a plurality of soil tilling members;
means for driving said soil tilling members to rotate about upwardly and rearwardly inclined axis of rotation, each said tilling member being in the form of a subsoiler essentially constituted by a forwardly and downwardly extending shaft rotating about a respective said axis of rotation and means for tilling disposed on the forward aspect of said shaft, said tilling means constructed and arranged for operating entirely under the top layer of soil through which said shaft extends during operation, a disc coulter for each said tilling member which is aligned in the machine's operative direction of travel and, as viewed from above, with its front side located substantially over the point of said shaft of said tilling member so as to create appropriate cooperation between said disc coulter and said tilling member; and
a plate-shaped scraper arranged over the rearward aspect of each said shaft or frame for freeing extraneous material from said rearward upward aspect of the corresponding said shaft.

14. A soil tilling machine comprising a plurality of soil tilling members;
means for driving said soil tilling members to rotate about upwardly and rearwardly inclined axes of rotation, each said soil tilling member being in the form of a subsoiler primarily constituted by a forwardly and downwardly extending shaft rotating about a respective said inclined axis of rotation and means for tilling disposed on the forward aspect of said shaft, each said tilling means constructed and arranged for operating entirely under the top layer of soil through which said shaft extends during operation; and
a disc coulter for each said shaft which is accurately aligned relative to the machine's operative direction of travel and which is disposed in such a way that its front side, when viewed from above, is located substantially over the point of the shaft of the said tilling means.

* * * * *